April 26, 1966 C. J. HIRE 3,248,501
THERMOSTATIC CONTROL HAVING ELECTRICALLY
INSULATED HEATER ELEMENT
Filed July 5, 1962 2 Sheets-Sheet 1
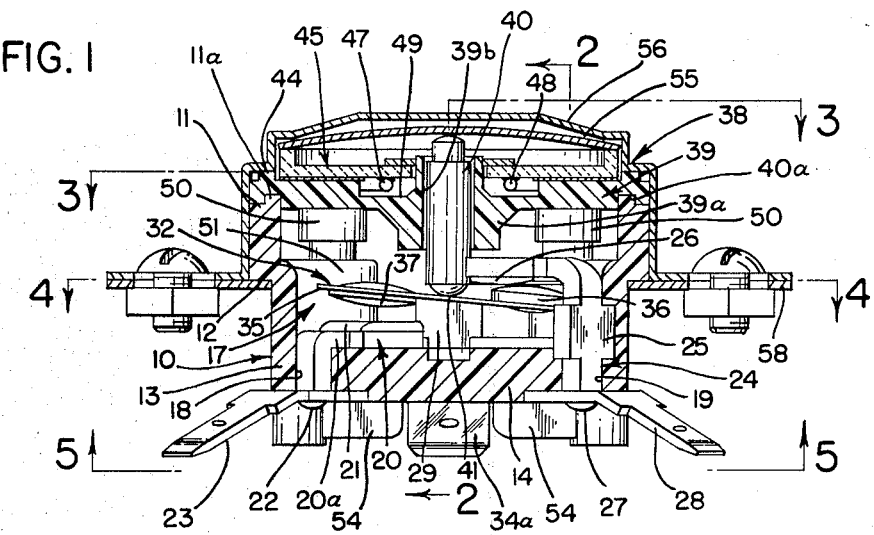
FIG. 1
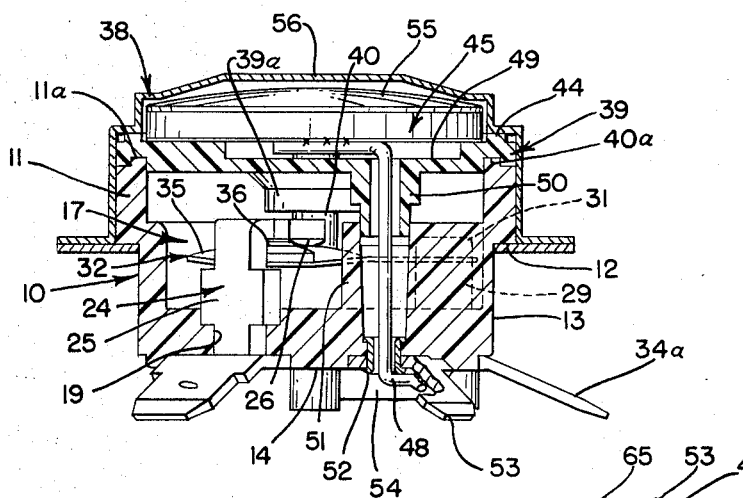
FIG. 2
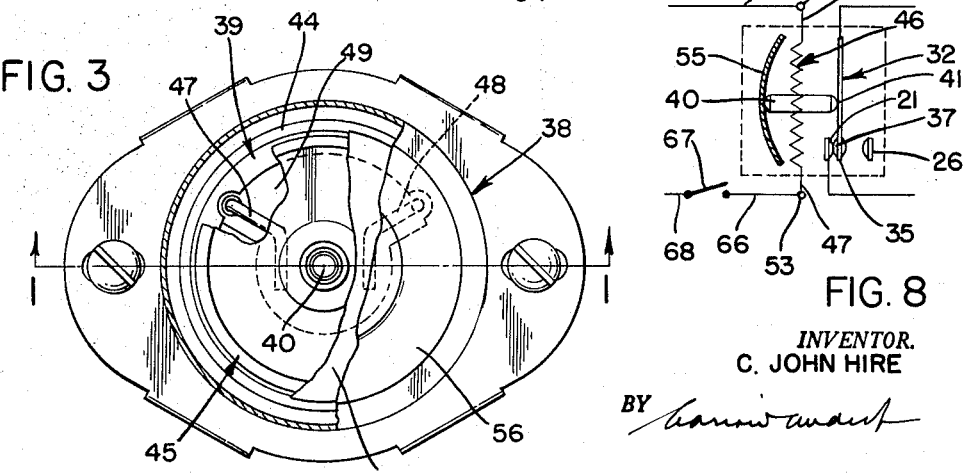
FIG. 3
FIG. 8
INVENTOR.
C. JOHN HIRE
BY
ATTORNEY April 26, 1966 C. J. HIRE 3,248,501
THERMOSTATIC CONTROL HAVING ELECTRICALLY
INSULATED HEATER ELEMENT
Filed July 5, 1962 2 Sheets-Sheet 2

INVENTOR.
C. JOHN HIRE
BY
ATTORNEY

United States Patent Office 3,248,501
Patented Apr. 26, 1966

3,248,501
THERMOSTATIC CONTROL HAVING ELECTRICALLY INSULATED HEATER ELEMENT
Charles John Hire, Mansfield, Ohio, assignor to Therm-O-Disc Incorporated, Mansfield, Ohio, a corporation of Ohio
Filed July 5, 1962, Ser. No. 207,640
5 Claims. (Cl. 200—122)

This invention relates to a thermostatic control of the bi-metallic type having an operating temperature range which may be varied, and wherein such adjustment is effected through a new and novel heater element which may be remotely controlled having a relatively low wattage input in comparison to the high current capacity of the thermostatic control.

In the past, various types of capillary tube, bulb-type thermostatic controls have been proposed having a variable operating temperature range. Although, the operating temperature of such devices was adjustable by remote control, they have been relatively high in cost and therefore, their scope of use was rather limited. Moreover, in such thermostatic controls the remote control adjustment, as a practical matter, had to be positioned at a predetermined fixed location with respect to the temperature-sensing portion of the control. It was also found that such devices were relatively difficult to calibrate at the point of temperature-sensing due to the switching mechanism of the control being responsive to means positioned at the point of temperature-sensing, thus such devices were generally characterized by instability of calibration. The heating means associated with such prior devices presented problems which precluded full acceptance thereof for household appliance use.

The present invention is directed to a novel thermostatic control whose operating temperature may be adjusted by remote control and which is free of the disadvantages associated with previously used capillary tube, bulb-type thermostatic controls.

In the present inventon, the temperature-sensing element of the thermostatic control is a bi-metallic member, preferably a bi-metallic disc, which moves with a snap action between stable positions of opposite curvature when the critical operating temperature is reached. Such snap action movement of the bi-metallic disc operates the switch contacts of the thermostatic control. In accordance with this invention the thermostatic control is provided with a new and novel internal electrically energized heater positioned in close proximity but insulated from one face of the bi-metallic member. By adjusting the heat dissipation of this heater, the operating temperature range of the appliance controlled by the thermostatic device may be varied appreciably. Such heat dissipation of the heater can be adjusted readily by a remote control at any distance from the thermostatic control proper, simply by controlling the current input to the heater. With this arrangement, the cost of the thermostatic control is substantially lower than that of the previously proposed thermostatic controls for the same purpose and there is the further advantage that the adjustable control means for the thermostatic device may be located at any selected distance from the appliance to which it is associated. The heater element is of such construction that should it be subjected to excessive current, it will burn out without flame or flash.

Accordingly, it is among the objects of the present invention to provide a novel and improved thermostatic control whose operating temperature may be adjusted selectively.

It is a further object of the invention to provide a novel thermostatic control having a bi-metallic temperature-sensing element and having means for adjustably effecting the bi-metallic element for operation at a lower temperature than would be possible in the absence of such means.

Another object of the invention is to provide a novel thermostatic control whose operating temperature may be adjusted by means of a remote control which may be located at any desired position away from the device.

Another object of this invention is to provide a thermostatic control of the bi-metallic disc type which includes a new and novel internal electrical heater whose heat dissipation may be selectively adjusted to determine the operating temperature of the bi-metallic disc, and which will fail safe if subjected to excessive current.

A further object of the invention is to provide a novel thermostatic control wherein a wide variation in operating temperatures of the control may be effected through the variation in temperature differential in the bi-metal disc induced therein by heat produced by the heater incorporated in the device.

These and other objects and advantageous features of the present invention will become more apparent from the following detailed description of a preferred embodiment thereof, taken in conjunction with the accompanying drawings wherein corresponding reference characters denote corresponding parts and wherein:

FIGURE 1 is a vertical sectional view taken centrally through a preferred embodiment of the present invention along line 1—1 of FIGURE 3;

FIGURE 2 is a vertical sectional view of the thermostatic control of FIGURE 1 taken along line 2—2 of FIGURE 1;

FIGURE 3 is a horizontal sectional view taken along line 3—3 of FIGURE 1, looking down into the thermostatic control just below the bi-metallic temperature sensing disc;

FIGURE 8 is a wiring diagram illustrating means for controlling the flow of current to the heater element of the thermostatic control.

Figure 5:
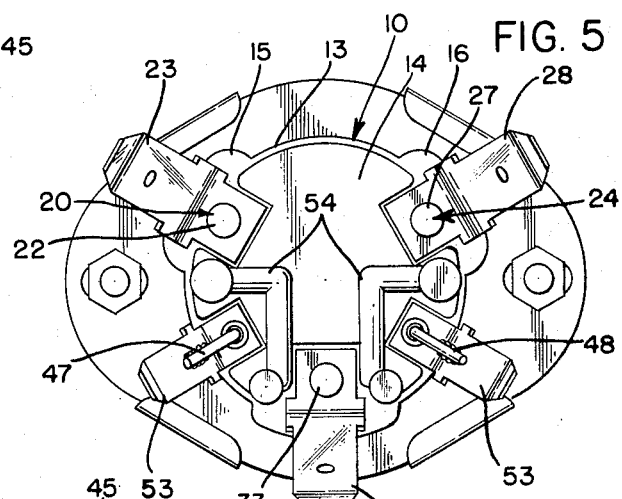
FIGURE 5 is a bottom plan view taken along the line 5—5 of FIGURE 1.
Figure 6:
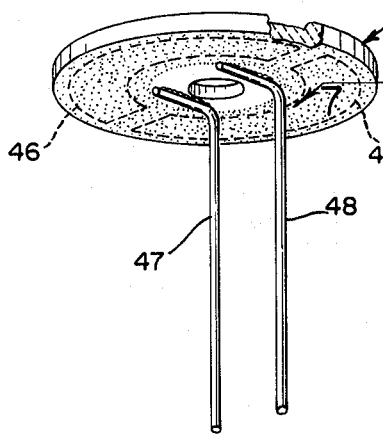
FIGURE 6 is a fragmentary perspective view of the novel heater element.

Referring to the drawings and particularly FIGURES 1 and 2 thereof, the thermostatic control of the present invention includes a housing 10 of suitable insulation material which is substantially cup-shaped in configuration. At its upper end the housing presents a generally cylindrical upstanding side wall 11. At the lower end of the side wall 11 the housing 10 is turned in laterally forming a horizontal annular wall 12. At its lateral inward extremity the annular horizontal wall 12 is joined to a cylindrical side wall 13, which at its lower end is joined to a flat horizontal bottom wall 14 serving to close the lower end of the housing 10. As shown in FIGURE 5, the side wall 13 is thickened to form outwardly extending arcuate bosses 15 and 16. The side wall 13 and bottom wall 14 adjacent the bosses 15 and 16 are formed with spaced vertical openings 18 and 19 which lead up into a switch chamber 17 defined by the housing 10.

As best shown in FIGURE 1 the opening 18 snugly receives a stationary contact carrying member 20 which is generally L-shaped in configuration. The stationary contact member 20 presents within the switch chamber 17, a horizontal leg member 20a which seats on the upper surface of the bottom wall 14 and carries an upwardly facing rounded contact surface 21. The stationary switch contact member 20 is riveted as at 22 to an angulated terminal plate 23 projecting outwardly from the lower face of the housing bottom wall 14. A lead in conductor, not shown, may be secured to the terminal plate 23 in any suitable manner.

A second stationary contact member 24 is similarly received within the opening 19. As shown in FIGURES 1 and 2, the contact member 24 is generally L-shaped in configuration with an enlarged arcuate portion 25 formed on the vertical leg thereof arranged to engage the inner surface of the side wall 13 of the housing 10. The horizontal leg portion of the contact member 24 is spaced from the bottom wall 14, projects inwardly into the switch chamber 17 and presents a downwardly facing rounded contact surface 26. The stationary contact member 24 is riveted as at 27 to an angulated terminal plate 28 which projects outwardly from the lower surface of the bottom wall 14 of the housing and is adapted to have connected thereto a suitable lead-in conductor not shown.

Figure 4:
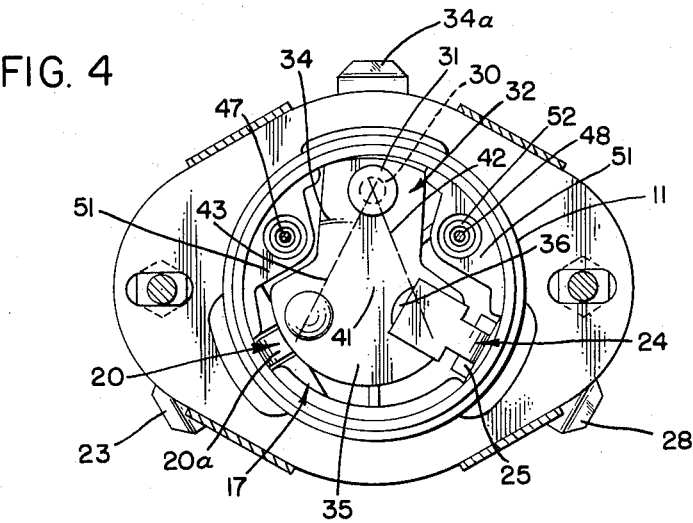
FIGURE 4 is a sectional view taken along line 4—4 of FIGURE 1, looking down on the mobile switch contact operating mechanism.

Between the vertical openings 18 and 19 the bottom wall 14 of the housing within the chamber 17 is provided with an upstanding boss 29, having a vertical opening 30, as shown in FIGURE 4, extending therethrough. A metal post 31 is mounted within the opening 30 and projects into chamber 17. At its upper end, the post 31 serves as a supporting member and electrical lead connection for the mobile switch contact-carrying arm 32 as will be more fully described hereinafter. At its lower end (see FIGURE 5) the post 31 is riveted as at 33 to a terminal plate 34a which may be connected in any suitable manner to a lead in conductor not shown. A cantilever support for the mobile contact-carrying arm 32 is provided by the upper surface of the boss 29 on which the arm is secured by the upper end of the metal post 31. The mobile contact-carrying arm 32 is formed with a pronounced bend 34, (FIGURE 4) which extends along a line laterally inward from one side edge and terminates short of the longitudinal centerline of the arm. This bend is located just beyond the forward edge of the cantilever support boss 29. Because of this bend, the outer free end 35 of the contact-carrying arm is inclined upwardly from the level of the top of the boss 29.

The free end 35 of the contact-carrying arm 32 carries a pair of laterally spaced contacts 36 and 37 for engagement selectively with the upper and lower fixed contact surfaces 26 and 21, respectively. One of these mobile contacts 36 presents an upwardly facing contact surface for engagement with the bottom surface of the upper fixed contact 24. At the opposite side, the free end 35 of the contact-carrying arm 32 carries a mobile contact 37 which presents a downwardly-facing contact surface for engagement with the upwardly-facing contact surface on the lower fixed contact 21. Both of the mobile contacts 36 and 37 and the corresponding fixed contacts are offset laterally from the longitudinal centerline of the contact-carrying arm 32, on opposite sides of such centerline. Because of the flexible nature of the contact-carrying arm 32 and the laterally offset disposition of the mobile contacts 36 and 37 with respect to the longitudinal centerline of the arm, the arm is capable of flexing laterally, that is, about its normal longitudinal centerline.

A cover or closure assembly is provided for the upper end of the housing 10, such cover being designated in its entirety by the reference numeral 38. The cover assembly 38 includes a disc shaped member 39 coextensive with the open end of the switch chamber 17 and provided with a central downwardly extending boss 39a having an opening 39b therethrough which slidably recevies a bumper member 40 of suitable insulation material. The periphery of the disc member 39 is formed with a circular groove 40a for the reception of an upstanding rib 11a on the upper edge surface of the side wall 11. The rounded lower end of the bumper 40 engages the upper surface of the contact-carrying arm 32. The point 41 where the bumper 40 applies its force to the contact-carrying arm, is offset laterally to one side of a straight line 42, as shown in FIGURE 4, joining the mobile contact 36 and the metal post 31 mounting the mobile contact-carrying arm 32 on the boss 29. Accordingly, as the plunger force is first applied it exerts a lateral torque on the contact-carrying arm 32 which tends to cause the mobile contact 36 to rock on the upper fixed contact 26 as it is separating therefrom, rather than moving directly down away from the upper fixed contact 24. From the upper fixed contact 24 the mobile contact 36 is progressively peeled away from the upper fixed contact. Because of this novel interaction between the fixed and mobile contacts, the tendency for an arc to form between them as they are being separated is greatly reduced.

In like manner the point of application of the plunger force is offset laterally to one side of a straight line 43 joining the other mobile contact 37 on the contact-carrying arm 32 and the mounting post 31 for the arm. Accordingly, after the mobile contact 37 first engages the lower fixed contact 21, and as the plunger continues to move downwardly the mobile contact 37 rocks on the lower fixed contact 21. Due to this rocking action the tendency for an arc to form between these contacts at this time is greatly reduced.

Figure 7:
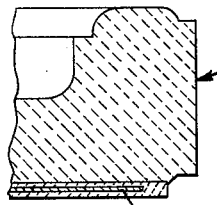
FIGURE 7 is a fragmentary sectional view taken along line 7—7 of FIGURE 6.

As best shown in FIGURES 1 and 2 the top face of the cover 38 is formed with a peripheral upstanding flange 44 thus providing a recess, in which is mounted a high temperature insulating disc 45 having high thermal conductivity. The lower surface of the disc is provided with arcuate shaped resistance heating elements 46, as shown in FIGURE 7. These elements preferably take the form of deposited or spray-coated electric resistive material and in turn are covered with suitable insulating material. The disc 45 is preferably made of a ceramic, glass or high temperature plastic material. It is an excellent conductor of heat and rapidly dissipates heat generated by the resistance elements deposited thereon. Being a good conductor the disc 45 presents a smooth and uniformly heated area to the bi-metallic disc. It is capable of withstanding greater current input than prior heaters without developing hot spots or burning. In the event that excessive current should be introduced into the heater circuit, the heater elements would burn out without any flame or flash and would not damage the remaining parts of the thermostatic control. Thus the device would fail safe if subjected to current or temperature overloads. Lead wires 47 and 48 are welded to the lower surface of the disc 45 and are in electrical contact with the heating elements 46. The upper surface of the member 39 is recessed as at 49 to accommodate the ends of the lead wires 47 and 48 at the point where they are welded to the heating elements so that the disc 45 will seat on the upper surface of the disc member 39. The lead wires 47 and 48 extend down through spaced tubular member 50 formed integrally with and projecting from the lower surface of the disc member 39. The lower ends of the tubular members 50 are of reduced diameter and are arranged to engage within the upper ends of spaced tubular bosses 51 formed on the bottom wall 14. A flanged bushing 52 is seated in the bottom of each of the tubular bosses 51 and projects beyond the outer surface of the bottom wall 14 to receive and have secured thereto a terminal 53. The lead wires 47 and 48 project through the tubular members 50, bosses 51, bushing 52 and are secured to terminals 53 in any suitable manner.

Formed integrally with the outer surface of the bottom wall 14 and projecting therefrom, are ribs 54 which serve to electrically separate the terminal elements secured to the wall 14 and prevent any shorting therebetween.

For effecting movement of the bumper 40, the cover assembly 38 is provided with a conventional bimetallic disc 55 which is seated on the top of the insulating disc 45 and is coextensive therewith. A suitable retaining cover member 56 is provided, which overlies the bimetallic disc 55 and retains it in place on the peripheral edge of the insulating disc 45. The cover member 56 is secured to the mounting member 58 by any suitable fastening members.

In the operation of the thermostatic control, normally (that is, while the temperature is below a predetermined value) the bi-metallic disc 55 is bowed outwardly at the center. At this time, the inherent resiliency of the mobile contact-carrying arm 32 biases the parts in the position as shown in FIGURE 1, with the mobile contact 36 engaging the stationary contact surface 26 and the bumper 40 being biased upward. At this time, the rounded upper end of the bumper 40 is spaced a short distance below the bi-metallic disc 55.

When the temperature to which the outer face of the bi-metallic disc 55 is exposed exceeds a predetermined value, the disc will snap inward at the center, reversing its curvature and forcing the bumper downwardly with a snap action. The bumper in turn moves the contact-carrying arm 32 downwardly causing the mobile contact 36 to disengage from the overlying fixed contact surface 26 and the mobile contact 37 to engage the underlying fixed contact 21.

Figure 9:
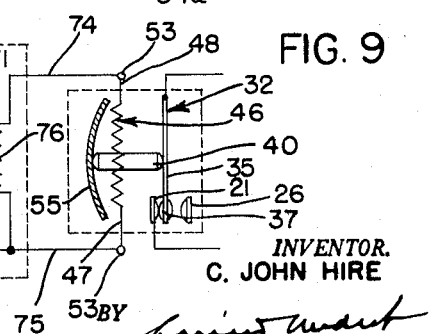
FIGURE 9 is a wiring diagram similar to FIGURE 8 illustrating means for controlling the current flow to the heater element of the device embodying a manually adjustable average power switch inserted in the circuit.

With reference to FIGURES 8 and 9 of the drawings there are disclosed wiring diagrams of electric circuits for the heating elements 46 which are effective in controlling the operating temperature of the thermostatic control.

In FIGURE 8 the external electric circuit for the heating elements 46 comprises a conductor 65, from one side of a source of electric current, terminal member 53, conductor 48, to one resistance heating element 46, from the other heating element 46, conductor 47, terminal member 53, conductor 66, switch 67 and conductor 68 to the other side of the source of electric current. Obviously, the switch 67 or other remote control device for controlling the current input to the heating elements 46 may be positioned at any desired location with respect to the thermostatic control.

The current in the elements 46 causes them to dissipate heat and the inner face of the bi-metallic disc 55 is subjected to such heat. As a consequence, the operating temperature of the bi-metallic disc (that is, the temperature at which it will snap over from the convex outward position shown to the convex inward position) will be lowered depending upon the heat dissipated by the heating elements 46. For example, in a thermostatic control employed in a clothes dryer, if the switch 67 in the external circuit was open, the control operates to open at 185 degrees Fahrenheit and close at 175 degrees Fahrenheit. With switch 67 closed the control would operate to open at 150 degrees Fahrenheit and close at 140 degrees Fahrenheit, the temperature being measured in the exhaust air conduit. By reducing the current being supplied to the heater elements 46, any desired operating temperature between these two extremes may be selected for the thermostatic control, so that the clothes dryer may be regulated for operation at the corresponding heat level. Throughout this range of adjustment, the operating temperature differential of the thermostatic control (in this case, at 10 degrees Fahrenheit) remains substantially the same, so that the sensitivity of the control is not adversely affected by the provision of the heater.

The structure illustrated in FIGURE 9 is predicated on a uniform voltage in the external circuit so that a uniform or predetermined amount of heat will be dissipated by the heater elements 46. In order to adapt the control for use with external circuits through the heater of varying voltages, the structure illustrated in FIGURE 9 is employed. With reference to this figure the external circuit of the heater elements 46 is as follows; from one side of a source of electric current through conductor 69, contact button 70, contact 71, bi-metal arm 72, which is anchored as at 73, conductor 74, terminal 53, lead-in conductor 48, heater element 46, from the other heater element 46 through conductor 47, terminal 53, conductor 75, to the other side of the source of electric current.

In close proximity to the bi-metallic contact-carrying arm 72 and across the conductor 74 and 75 there is placed a heater element 76 which is effective upon the bi-metal arm 72. As the voltage in the line fluctuates above a predetermined amount the heater 76 causes the switch comprising the contacts 70 and 71 and arm 72 to cycle so that a uniform amount of heat is caused to be dissipated by the heater elements 46. A manually actuated adjusting member 77 operable upon bi-metallic contact-carrying arm 72 is provided to affect cycling of the device at a predetermined temperature.

From the foregoing it will be apparent that the provision of the electrical heating elements 46 enables the bi-metallic disc type thermostatic control to be adjustable by remote control. This constitutes an advantageous arrangement which is lower in cost than previously proposed thermostatic controls for this purpose, as well as being more flexible in its practical utility.

While there has been described in detail herein and illustrated in the accompanying drawings a presently preferred embodiment of the invention, it is to be understood that various modifications and refinements which depart from the illustrated embodiment may be adopted without departing from the spirit and scope of the invention.

I claim:

1. A thermostatic control comprising a cup-shaped housing defining a switch chamber, a switch mounted in said chamber having a fixed contact, a cantilever mounted contact-carrying arm having a mobile contact mounted on the outer end of said arm in operative relation to said fixed contact, a disc shaped closure member for said switch chamber, a high temperature insulating disc having high thermal conductivity seated on the outer surface of said closure member, electric resistance material disposed on the surface of said disc adjacent to the closure member, a bi-metallic disc mounted on the peripheral edge of the opposite surface of said insulating disc having relatively stable positions of opposite concavity and a slidable member carried by said closure member for actuating said contact-carrying arm in response to movement of the bi-metal disc from outward to inward position of concavity.

2. A thermostatic control comprising a housing defining an open end switch chamber having current-carrying switch contacts mounted therein, closure means for the open end of said chamber, said closure means including a disc member, a second disc of high temperature insulating material having high thermal conductivity mounted on said first disc and electric resistance material disposed on the lower surface of said second disc, a bi-metallic disc mounted on the exterior of said closure means having relatively stable positions of opposite concavity and adapted to exert pressure on a slidable member extending through said closure means to actuate the switch contacts upon movement from one position of concavity to the other, and means for supplying current to said electric resistance material.

3. In a thermostatic switch a housing defining an open end switch chamber having current-carrying switch contacts mounted therein and a bi-metallic disc for actuating said switch contacts, the improvement which comprises a closure assembly for the open end of said switch chamber interposed between and shielding the bi-metallic disc from the switch contacts, said closure assembly including two discs, one mounted upon the other, a thin layer of electric resistance material disposed on the lower surface of the upper of said discs, said upper disc having high thermal conductivity, means for conveying electric current to said resistance material and a slidable member carried by said closure assembly for translating movement from said bi-metallic disc to said switch contacts for actuating the same.

4. A thermostatic control comprising a cup-shaped housing defining a switch chamber, a switch mounted in said chamber having a flexible contact-carrying arm mounted at one end in cantilever fashion and having a movable free end, a pair of laterally spaced mobile contacts on the outer free end of the contact-carrying arm, fixed contacts in the path of movement of said mobile contacts to be engaged thereby, a closure assembly for said switch chamber including a pair of superimposed disc member, a thin layer of electric resistance material on the lower surface of the upper of said disc members, said upper disc member having high thermal conductivity means including a bi-metallic disc mounted on said closure assembly having relatively stable positions of opposite concavity and a reciprocating member carried by one of said disc members for applying force to said contact-carrying arm at a location thereon between its mounted end and free end and intermediate a pair of straight lines between the mounted end and said mobile contacts so as to move said mobile contacts with respect to said fixed contacts and rock a mobile contact on its adjacent fixed contact when in engagement therewith.

5. In a thermostatic control, thermally responsive switch apparatus comprising a bi-metallic disc movable from one position of concavity to the opposite position of concavity while being rigidly retained at its periphery in response to heat radiated thereto, a surface having material thereon resistive to the passage of electrical current and generating heat in response to the passage of current therethrough, said surface being substantially parallel to a plane passing through the periphery of said bi-metallic disc, said surface being spaced from said bi-metallic disc by a dielectric member having high thermal conductivity and electrically insulating said surface of electrical resistant material from said bi-metallic member, an electrical and thermal insulating member being interposed between said surface of electrical resistance material and a chamber containing a switch for said thermostatic control, said dielectric and said surface and said insulating members having coaxial apertures through which a bumper member passes communicating with the movable contact of said switch and said bi-metallic disc, said bumper member translatable along the axis of said apertures in response to movement of said bi-metallic disc, said movable contact of said switch opening and closing contacts of said switch in response to the movement of said bumper member.

References Cited by the Examiner
UNITED STATES PATENTS

| | | | |
|---|---|---|---|
| 2,298,164 | 10/1942 | Raney | 200—122 X |
| 2,317,830 | 4/1943 | Vaugnan | 200—122 X |
| 2,414,531 | 1/1947 | Johns | 200—122 |
| 2,486,148 | 10/1949 | Glynn et al. | 219—19 |
| 2,564,987 | 8/1951 | Mochel | 219—19 |
| 2,800,555 | 7/1957 | Sundt | 200—122 |
| 2,945,933 | 7/1960 | Di Girolamo et al. | 200—122 |
| 2,954,447 | 9/1960 | Bolesky et al. | 200—138 |
| 3,010,097 | 11/1961 | Boddy | 200—122 |

BERNARD A. GILHEANY, *Primary Examiner.*

Dedication 3,248,501.—*Charles John Hire*, Mansfield, Ohio. THERMOSTATIC CONTROL HAVING ELECTRICALLY INSULATED HEATER ELEMENT. Patent dated Apr. 26, 1966. Dedication filed Apr. 4, 1969, by the assignee, *Therm-O-Disc, Incorporated*.
Hereby dedicates said entire patent to the Public.
[*Official Gazette September 23, 1969.*]